United States Patent

Muller

Patent Number: 5,770,140
Date of Patent: Jun. 23, 1998

[54] CURABLE COMPOSITIONS

[75] Inventor: Heinz Muller, Mainz, Germany

[73] Assignee: Dow Corning GmbH, Wiesbaden, Germany

[21] Appl. No.: 723,211

[22] Filed: Sep. 27, 1996

[30] Foreign Application Priority Data

Oct. 4, 1995 [GB] United Kingdom .................. 9520280

[51] Int. Cl.$^6$ .............................. B29C 71/00; C08J 5/00; C08G 77/06
[52] U.S. Cl. ................. 264/236; 264/331.11; 264/347; 528/24
[58] Field of Search ............................. 264/331.11, 236, 264/347; 524/267, 588, 862; 523/351, 212; 528/24

[56] References Cited

U.S. PATENT DOCUMENTS

| | | | |
|---|---|---|---|
| 3,842,601 | 10/1974 | Bruner | 260/46.5 G |
| 4,011,197 | 3/1977 | Lee | 264/489 |
| 4,322,517 | 3/1982 | Deubzer et al. | 528/14 |
| 4,329,275 | 5/1982 | Hatanaka et al. | 524/862 |
| 4,487,906 | 12/1984 | Kniege et al. | 528/15 |
| 4,539,357 | 9/1985 | Bobear | 524/267 |
| 4,830,801 | 5/1989 | Rossberger et al. | 264/102 |
| 4,935,483 | 6/1990 | Gamon et al. | 528/31 |
| 5,008,305 | 4/1991 | Kennan et al. | 523/212 |
| 5,082,886 | 1/1992 | Jeram et al. | 524/403 |
| 5,122,562 | 6/1992 | Jeram et al. | 524/403 |
| 5,210,126 | 5/1993 | Ushio et al. | 524/588 |
| 5,589,526 | 12/1996 | Sienel et al. | 523/351 |
| 5,610,213 | 3/1997 | Sumpter et al. | 524/267 |

OTHER PUBLICATIONS

Rubber Technology by Morton 3rd Edition pp. 106–115 (1987).

*Primary Examiner*—Jan H. Silbaugh
*Assistant Examiner*—Suzanne E. Mason
*Attorney, Agent, or Firm*—Jennifer S. Warren

[57] ABSTRACT

A curable composition which contains a siloxane polymer, filler and a curing agent which is capable of effecting the cure when heated, wherein the curing agent comprises a 1,1 di(tertiary butylperoxy) 3,3,5-trimethylcyclohexane in combination with peroxide selected from the group consisting of dicumyl peroxide and 2,5-di(tertiary butylperoxy) hexane. Also disclosed is a method of providing a molding using said curable composition.

12 Claims, No Drawings

CURABLE COMPOSITIONS

This invention is concerned with curable compositions and is particularly concerned with silicone compositions curable to an elastomeric condition by heat.

One type of curable material comprises a curable elastomer siloxane composition which comprises a siloxane polymer, a filler and a curing agent which is capable of effecting the cure when heated. Compositions of this type which are used for moulding purposes may employ a peroxide curing agent and typically the peroxide may be dicumyl peroxide (DCP) or 2,5-di(tertiary butylperoxy) hexane (DHBP). The characteristics of DCP are such that a mould temperature of 170° C. is recommended in order to obtain a consistent cure at a reasonable cure speed of compositions containing it as the curative, whereas a mould temperature of about 180° C. is recommended in order to obtain a consistent cure at a reasonable cure speed of compositions comprising DHBP as the curative. In the art of moulding parts from curable elastomeric compositions it is common to encounter situations where it is impossible or unacceptable to heat the moulds to temperatures as great as this and it is normal to encounter requirements to heat the moulds to 150° C. to 160° C. at most. In these circumstances the recommended cure temperatures for use of DCP or DHBP as the curative are not achieved.

Surprisingly, I have now found that one may accelerate the cure of silicone elastomeric compositions by use of a selected mixture of peroxides as curative, comprising 1,1 di(tertiary butylperoxy)3,3,5-trimethylcyclohexane (TMCH) in combination with either DCP or DHBP. Using these mixtures the cure speed can be increased by as much as 25% at temperatures in the range of 150° C. to 170° C.

The present invention provides in one of its aspects, a curable composition comprising a siloxane polymer, a filler and a curing agent which is capable of effecting the cure when heated characterised in that the curing agent comprises a 1,1 di(tertiary butylperoxy) 3,3,5-trimethylcyclohexane in combination with either dicumyl peroxide or 2,5-di(tertiary butylperoxy) hexane.

A composition according to the invention comprises a siloxane polymer, a filler and the specified peroxides, the siloxane polymer preferably being a diorganopolysiloxane having silicon-bonded organic substituents selected from methyl groups, fluoroalkyl groups, phenyl groups and vinyl groups, at least 70 percent of the total substituents being methyl groups and from 0.01 to 2 percent being vinyl.

In the aforementioned preferred diorganopolysiloxanes employed in this invention at least 70 percent of the total silicon-bonded substituents are methyl groups and from 0.01 to 2 percent, preferably 0.04 to 1 percent, of the total substituents are vinyl. Any remaining substituents may be phenyl groups. Such curable polydiorganosiloxanes are well-known in the silicone elastomer art and examples of operative diorganopolysiloxanes are copolymers of dimethylsiloxane and methylvinylsiloxane units, copolymers of dimethylsiloxane, methylvinylsiloxane and methylphenylvinylsiloxane units, copolymers of dimethylsiloxane, methylvinylsiloxane and trimethylsiloxane units and copolymers of dimethylsiloxane, methylvinylsiloxane and diphenysiloxane units.

A composition according to the invention may contain any one or more of the fillers employed in the manufacture of siloxane elastomers. Suitable fillers include reinforcing silicas, magnesium oxide, clay, diatomaceous earth, calcium carbonate and finely ground quartz.

The proportion of the filler component employed in the compositions is not narrowly critical, but I prefer to incorporate the filler in a proportion from 5 to 200 parts by weight per 100 parts by weight of the diorganopolysiloxane.

If desired, the filler may be treated to modify its compatibility with the other components of the composition or to improve its storage stability. The fillers may be pre-treated or treated in situ by the addition of one or more treating agents during mixing of the composition. Suitable filler treating agents will be apparent to the person skilled in the art of siloxane elastomer manufacture and include silanes, such as dimethyldichlorosilane and trimethyl-ethoxysilane, siloxanes such as cyclic siloxanes and hydroxyl or vinyl or phenyl substituted low molecular weight polydimethylsiloxanes and silazanes such as hexamethyl-disilazane.

The curing agent peroxides are known compounds. In order to facilitate the mixing of the peroxide with the remaining components of the composition it is preferred to employ the peroxide as a paste in a suitably inert carrier, preferably a polydimethylsiloxane, which is compatible with said other components. The peroxides are incorporated in proportions which are conventional for the peroxide cure of siloxane elastomers, generally from 0.5 to 6 parts (and preferably 0.5 to 2.0) for 100 parts of the total weight of polydiorgano-siloxane plus filler.

The curable compositions according to this invention may be prepared using conventional siloxane elastomer mixing or compounding equipment. Having regard to the intended use of the compositions as moulding materials, the curable compositions should have a viscosity which renders them capable of being dispensed and processed with the appropriate equipment.

It is thus preferred that the compositions comprise one or more polydiorganosiloxanes of molecular weight in excess of 500,000 containing about 0.1 to 0.5 mole % units of the formula $(CH_3)_2(CH_2=CH_2)SiO_{1/2}$ or $(CH_2)(CH_2=CH_2)SiO$, a low molecular weight diorganopolysiloxane as plasticiser and silica filler. In general, it is preferred that the silica filler is employed in a proportion of from 30 to 160 parts by weight per 100 parts by weight of polydiorganosiloxane.

Compositions according to the invention may be used to provide elastomeric mouldings. They may be used, for example, in a method according to the invention to provide a moulding which comprises introducing to a mould having a closed moulding cavity a composition according to the invention, heating the mould to a temperature in the range 150° C. to 170° C. and stripping the cured composition from the mould.

Heating of the mould may be achieved according to known procedures and is most conveniently carried out by electrical heating. If desired the initial cure step may be followed by a post-cure at a higher temperature.

The following Examples in which the parts are expressed by weight illustrate the invention.

Three base compositions were used. Composition A comprised 38 parts of a first high molecular weight polydimethylsiloxane of gum-like consistency, this first polydimethylsiloxane having about 0.14 mole % methyl vinyl siloxane units and having dimethyl vinyl siloxy end groups, 38 parts of a second high molecular weight polydimethylsiloxane of gum-like consistency, this second polydimethylsiloxane having no methyl vinyl siloxane units and having dimethyl vinyl siloxy end groups, 1 part of a dimethyl, methyl, methylvinyl, phenyl silicone resin, 4 parts of an oligomeric hydroxypolydimethylsiloxane and 21 parts of fumed silica. Composition B comprised 38 parts of the second high molecular weight polydimethylsiloxane, 10 parts of a third high molecular weight polydimethylsiloxane being a dimethyl-vinylsiloxy-terminated dimethyl, methylvinyl siloxane having a vinyl content of about 0.3%, 2 parts of a low molecular weight poly(dimethylsiloxy) methylvinylsilane diol, 3 parts of the oligomeric hydroxypolydimethylsiloxane, 20 parts of fumed silica and 32 parts of quartz. Composition C comprised 32 parts of the first high molecular weight polydimethylsiloxane of gum-like consistency, 36 parts of the second high molecular weight polydimethylsiloxane of gum-like consistency, 6 parts of the fourth high molecular weight polydimethylsiloxane of gum-like consistency, 2 parts of the fifth high molecular weight polydimethylsiloxane of gum-like consistency, 5 parts of the short chain hydroxyl end blocked polydimethylsiloxane fluid, 1 part of the low molecular weight poly(dimethylsiloxy) methylvinylsilane diol, 1.5 parts of the oligomeric hydroxy polydimethyl siloxane and 31 parts of fumed silica.

Compositions I to IX were prepared from these base compositions by mixing them with TMCH (40%)and DCP (40%) or DHBP (40%) in amounts per hundred parts of silicone plus filler as shown in Table I.

TABLE I

| Composition | Base Comp | TMCH | DCP | DHBP |
|---|---|---|---|---|
| I | A | 1.4 | — | — |
| II | A | | 1.4 | — |
| III | A | 0.3 | 1.1 | — |
| IV | B | 1.4 | | |
| V | B | | 1.4 | |
| VI | B | 0.3 | 1.1 | |
| VII | C | 1.5 | | |
| VIII | C | | | 1.5 |
| IX | C | 0.5 | | 1.2 |

The compositions I to IX were introduced to a closed mould and cured for 10 minutes at 170° C. and then subjected to various standard tests.

In Table II NPC means no post cure was carried out. PC means the samples were cured for 10 minutes at 170° C, followed by a further 4 hours heat treatment at 200° C in an oven. Rheometer data were generated with a Monsanto R100 rheometer.

The use of TMCH on its own could speed up the cure even further, but can have a negative impact on physical properties especially for materials with lower vinyl content like Compositions VII, VIII, and IX.

The column "Diff.in %" records the difference in value between samples compared.

TABLE II

| | Composition I | | Composition II | | Composition III | | Diff · in % II–III |
|---|---|---|---|---|---|---|---|
| 150° C. | | | | | | | |
| scorch (s) | 67 | | 208 | | 114 | | −45,2 |
| $t_{10}$ (min) | 1,28 | | 3,85 | | 2,12 | | −44,9 |
| $t_{90}$ (min) | 3,68 | | 10,43 | | 6,45 | | −38,2 |
| 160° | | | | | | | |
| scorch (s) | | | 109 | | 78 | | −28,4 |
| $t_{10}$ (min) | | | 2,03 | | 1,46 | | −28,1 |
| $t_{90}$ (min) | | | 5,1 | | 4,22 | | −17,3 |
| 170° C. | | | | | | | |
| scorch (s) | 31 | | 69 | | 47 | | −31,9 |
| $t_{10}$ (min) | 0,61 | | 1,29 | | 0,87 | | −32,6 |
| $t_{90}$ (min) | 1.42 | | 2,93 | | 2,34 | | −20,1 |

TABLE II-continued

| | Composition I | | Composition II | | Composition III | | Diff · in % II–III |
|---|---|---|---|---|---|---|---|
| Phys · Props | NPC | PC | NPC | PC | NPC | PC | |
| Hardness (Shore A) | 44 | 44 | 46 | 47 | 44 | | |
| Tensile (MPa) | 7,2 | 7,6 | 6,3 | 7,3 | 8,5 | | |
| Elongation (%) | 485 | 518 | 436 | 445 | 502 | | |
| Tear ASTM D624B (N/mm) | 14,4 | 15,6 | 14,1 | 14,5 | 13,4 | | |
| CS 22h 175C. (%) | 43,6 | 28,4 | 27,6 | 16,5 | 32,1 | | |

NB - In Tables II, III and IV:
(i) For explanations of "scorch", "$t_{10}$" and "$t_{90}$", see for example Morton "Rubber Technology" 3rd Edition pp 106–115
(ii) "CS 22h 175C." refers to compression set after 22 hours at 175° C.

TABLE III

| | Composition IV | | Composition V | | Composition VI | | Diff · in % V–VI |
|---|---|---|---|---|---|---|---|
| 150° C. | | | | | | | |
| scorch (s) | 44 | | 127 | | 73 | | −45,5 |
| $t_{10}$ (min) | 1,00 | | 2,8 | | 1,64 | | −41,4 |
| $t_{90}$ (min) | 5,65 | | 14,75 | | 11,1 | | −24,7 |
| 160° | | | | | | | 48 |
| scorch (s) | | | | | 1,06 | | |
| $t_{10}$ (min) | | | | | 6,43 | | |
| $t_{90}$ (min) | | | 5,1 | | 4,22 | | −17,3 |
| 170° C. | | | | | | | |
| scorch (s) | 23 | | 48 | | 31 | | −35,4 |
| $t_{10}$ (min) | 0,50 | | 1,02 | | 0,69 | | −32,4 |
| $t_{90}$ (min) | 2,81 | | 4,25 | | 3,21 | | −24,5 |
| Phys · Props | NPC | PC | NPC | PC | NPC | PC | |
| Hardness (Shore A) | 82 | 83 | 83 | 84 | 82 | | |
| Tensile (MPa) | 7,8 | 5,1 | 8,1 | 6,6 | 7,7 | | |
| Elongation (%) | 148 | 103 | 152 | 124 | 145 | | |
| Tear ASTM D624B (N/mm) | 15,6 | 16,2 | 15,8 | 16,6 | 16,7 | | |
| CS 22h 175C. (%) | 25,9 | 18,2 | 19 | 11,9 | 22,8 | | |

TABLE IV

| | Composition VII | Composition VIII | Composition IX | Diff · in % VIII–IX |
|---|---|---|---|---|
| 170° C. | | | | |
| scorch (s) | | 72 | 40 | −44,4 |
| $t_{10}$ (min) | | 1,36 | 0,77 | −43,4 |
| $t_{90}$ (min) | | 3,29 | 2,26 | −31,3 |
| 185° C. | | | | |
| scorch (s) | | 43 | 27 | −37,2 |
| $t_{10}$ (min) | | 0,82 | 0,51 | −37,8 |
| $t_{90}$ (min) | | 1,78 | 1,37 | −23,0 |

TABLE IV-continued

| | Composition VII | | Composition VIII | | Composition IX | | Diff · in % VIII–IX |
|---|---|---|---|---|---|---|---|
| 200° C. | | | | | | | |
| scorch (s) | | | 25 | | 16 | | −36,0 |
| $t_{10}$ (min) | | | 0,48 | | 0,33 | | −31,3 |
| $t_{90}$ (min) | | | 1,02 | | 0,86 | | −15,7 |
| Phys · Props | NPC | PC | NPC | PC | NPC | PC | |
| Hardness (Shore A) | 60 | 62 | 61 | 63 | | 61 | |
| Tensile (MPa) | 9,7 | 8,8 | 10,2 | 10,6 | | 10,5 | |
| Elongation (%) | 439 | 439 | 455 | 450 | | 448 | |
| Tear ASTM D624B (N/mm) | 23,1 | 26,7 | 26,1 | 23,9 | | 24,6 | |
| CS 22h 175C. (%) | 66,7 | 41,8 | 26,9 | 14,7 | | 18,8 | |

That which is claimed is:

1. A curable composition comprising a siloxane polymer, filler, and a curing agent which is capable of effecting cure of the composition when heated, wherein the siloxane polymer is a diorganopolysiloxane having silicon-bonded organic substituents selected from the group consisting of methyl groups, fluoroalkyl groups, phenyl groups and vinyl groups, and wherein the curing agent consists essentially of 1,1 di(tertiary butylperoxy) 3,3,5-trimethylcyclohexane in combination with a peroxide selected from a group consisting of dicumyl peroxide and 2,5-di(tertiary butylperoxy) hexane.

2. A curable composition according to claim 1 wherein at least 70 percent of the total organic substituents on the diorganopolysiloxane are methyl groups, and from 0.01 to 1 percent of the total organic substituents are vinyl groups.

3. A curable composition according to claim 2 wherein 0.04 to 1 percent of the total organic substituents of the diorganopolysiloxane are vinyl groups.

4. A curable composition according to claim 2 wherein the remaining substituents of the diorganopolysiloxane are phenyl groups.

5. A curable composition according to claim 1 wherein the siloxane polymer is selected from the group consisting of copolymers of dimethylsiloxane and methylvinylsiloxane units, copolymers of dimethylsiloxane, methylvinylsiloxane and methylphenylvinylsiloxane units, copolymers of dimethylsiloxane, methylvinylsiloxane and trimethylsiloxane units and copolymers of dimethylsiloxane, methylvinylsiloxane and diphenysiloxane units.

6. A curable composition according to claim 1 wherein the filler is pre-treated by a filler treating agent selected from the group consisting of silanes, siloxanes and silazanes.

7. A curable composition according to claim 1 wherein the filler is treated in situ by a filler treating agent selected from the group consisting of silanes, siloxanes and silazanes.

8. A curable composition according to claim 1 wherein the curing agent is employed as a paste in a compatible inert carrier.

9. A curable composition according to claim 1 wherein the curing agent is incorporated in an amount from 0.5 to 6 parts per 100 parts of the total weight of siloxane polymer plus filler.

10. A curable composition according to claim 1 comprising one or more polydiorganosiloxanes of molecular weight in excess of 500,000 containing about 0.1 to 0.5 mole % units ofr a formula selected from the group consisting of $(CH_3)_2(CH_2=CH_2)SiO_{1/2}$ and $(CH_2)(CH_2=CH_2)SiO$, a low molecular weight diorganopolysiloxane as plasticiser, and silica filler.

11. A method of providing a molding from a curable composition, which curable composition comprises a siloxane polymer, wherein the siloxane polymer is a diorganopolysiloxane having silicon-bonded organic substituents selected from the group consisting of methyl groups, fluoroalkyl groups, phenyl groups and vinyl groups, filler, and a curing agent which is capable of effecting cure of the composition when heated, wherein the curing agent consists essentially of a 1,1, di(tertiary butylperoxy) 3,3,5-trimethylcyclohexane in combination with a peroxide selected from a group consisting of dicumyl peroxide and 2,5-di(tertiary butylperoxy) hexane, which method comprises introducing the curable composition to a mold having a closed molding cavity, heating the mold to a temperature in the range of 150° C. to 170° C. for about 10 minutes to cure the composition, stripping the cured composition from the mold, and post-curing the molding for 0 to about 4 hours and about 200° C.

12. A composition according to claim 1 wherein the ratio of 1,1, di(tertiary butylperoxy) 3,3,5-trimethylcyclohexane to the dicumyl peroxide or 2,5-di(tertiary butylperoxy) hexane is in the range of 1:2.4 to 1:3.7.

* * * * *